(12) United States Patent
Sonoda et al.

(10) Patent No.: US 7,545,821 B2
(45) Date of Patent: Jun. 9, 2009

(54) NETWORK SYSTEM AND COMMUNICATION METHOD

(75) Inventors: Toshihiro Sonoda, Kawasaki (JP); Shigehiro Idani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 690 days.

(21) Appl. No.: 11/213,987

(22) Filed: Aug. 30, 2005

(65) Prior Publication Data

US 2006/0268861 A1 Nov. 30, 2006

(30) Foreign Application Priority Data

May 27, 2005 (JP) ............................. 2005-156149

(51) Int. Cl.
*H04L 12/28* (2006.01)
(52) U.S. Cl. .................. 370/401; 370/392; 370/474
(58) Field of Classification Search ................ 370/351, 370/389, 392, 401, 474
See application file for complete search history.

(56) References Cited

U.S. PATENT DOCUMENTS 7,023,847 B2 * 4/2006 Zhang ..................... 370/389
7,035,257 B2 * 4/2006 Vafaei ..................... 370/389
7,110,402 B2 * 9/2006 Block et al. ............... 370/389
7,418,511 B2 * 8/2008 Takechi et al. ............ 709/229

FOREIGN PATENT DOCUMENTS

JP 2004-304317 10/2004

* cited by examiner

*Primary Examiner*—Jason E Mattis
(74) *Attorney, Agent, or Firm*—Kratz, Quintos & Hanson, LLP

(57) ABSTRACT

A network system and a communication method are provided to solve an NAT problem to functionalize a P2P application in case that new port information (number is assigned to an NAT device. One communication device sends a pseudo-packet containing an address of another communication device, to a port information transmitting device via an address translation device; the port information transmitting device sends a response to the received pseudo-packet to the communication device; and the address translation device assigns new port information corresponding to the communication device address using the response and sends the address of the communication device and the assigned port information to the communication device. The communication device sends the received address of the communication device and the assigned port information to another communication device; and another communication device transmits information with the communication device using the received address of the communication device and the assigned port information.

20 Claims, 12 Drawing Sheets

F I G. 9
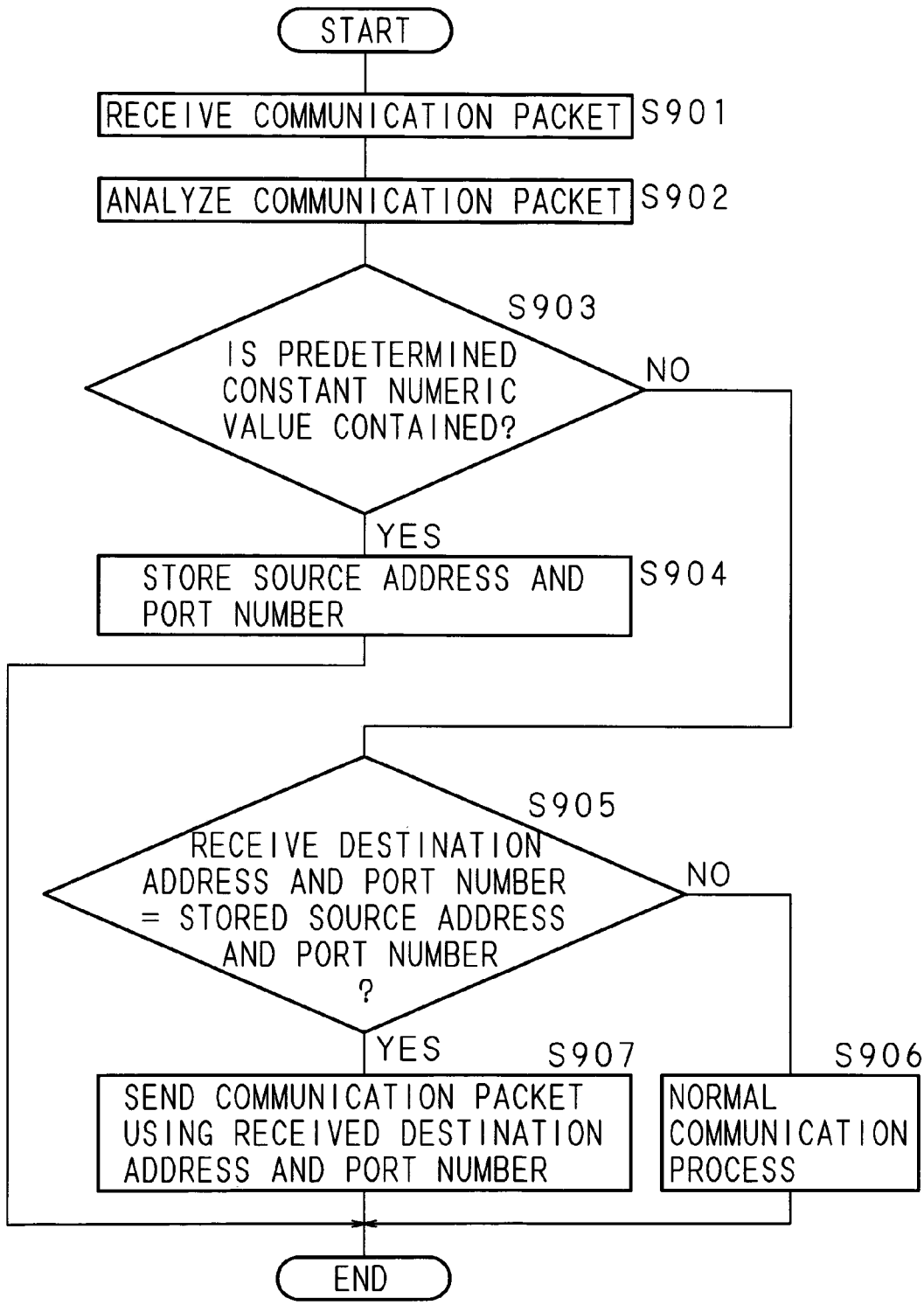

NETWORK SYSTEM AND COMMUNICATION METHOD

CROSS-REFERENCE TO RELATED APPLICATIONS

This Nonprovisional application claims priority under 35 U.S.C. §119(a) on Patent Application No. 2005-156149 filed in Japan on May 27, 2005, the entire contents of which are hereby incorporated by reference.

BACKGROUND OF THE INVENTION

1. Field of the Invention

The present invention relates to a network system and a communication method of performing communication via an NAT device using communication devices connected via a network.

2. Description of the Related Art

Upon communication being performed on the Internet, an Internet protocol (hereinafter, referred to as the IP) is used as a routing protocol. Since a currently common IP version 4 uses a "32-bits" number for specifying an address, it has become difficult to specify a unique address to each communication terminal as the Internet becomes popularized. To solve the problem, a method is developed to use a private address assigned to a predetermined limited area (local area), aside from a global address as a global IP address.

In communication between the communication devices using the private address, the private address is translated into the global address by a network address translation table (hereinafter, refereed to as the NAT). Therefore, one private address needs to have one global address corresponding thereto, so that, when a plurality of communication devices are present within one local area, only one communication device within the local area is connected to the Internet. That is, there was a problem that the plurality of communication devices within the same local area had been unable to be connected simultaneously to the Internet. Consequently, a port number is used as a sub-address to establish the simultaneous connection between the plurality of communication devices within the same local area and the Internet.

However, especially with a P2P application, it can not get the private address and the corresponding port number before NAT translation of the communication device on the other side, causing a so-called NAT problem where the P2P application fails. Conventionally, the NAT problem is solved by, for example, providing an NAT device as a gateway from the local area to monitor a communication session that potentially causes the NAT problem and update the addresses and the port numbers in packets on both sides. However, this method is not preferable in that, when a new protocol is developed, it is required to replace the NAT device with a new one compliant with the new protocol, thereby the P2P application may not work correctly until the new NAT device compliant with the new protocol is developed. Moreover, there is another problem in view of the security because the NAT device updates the packet without permission.

Consequently, as means of solving the foregoing NAT problem, methods have been developed to functionalize the P2P application using an UPnP (Universal Plug and Play internet Gateway Device) standard or an STUN (Simple Traversal UDP through NAT) standard.

SUMMARY OF THE INVENTION

The present invention, being made in view of the foregoing circumstances, is intended to provide a network system and a communication method for solving the NAT problem to functionalize the P2P application in case that new port information (number) is assigned to an NAT device.

Moreover, the present invention is intended to provide the network system and the communication method which enable the P2P application to be executed continuously by preventing the port information (number) newly assigned to the NAT device to be erased.

Furthermore, the present invention is intended to provide the network system and the communication device which can prevent the address translation to malfunction by erasing such as the port information (number), a global address, and a private address assigned to the NAT device from a memory.

To achieve the above objects, the network system according to the first invention is characterized by being provided with: the plurality of communication devices which can communicate with each other; an address translation device having a table to translate the global address and the private address into each other, the address translation device assigns the port information to the private address to be used and relays data transmission between the communication devices; and a port information transmitting device connected between the address translation device and an external network to transmit the port information assigned by the address translation device, wherein: one of said plurality of communication devices is provided with means for sending a pseudo-packet containing an address of another communication device and predetermined information, before sending information to another communication device, to the port information transmitting device via the address translation device; the address translation device is provided with means for assigning the new port information to a pseudo-packet address of one of the communication devices, and means for sending the address of one of the communication devices and the assigned port information to the port information transmitting device; the port information device is provided with determining means for determining whether a received communication packet contains the predetermined information, and means for sending the port information corresponding to the received address of one of the communication device when said determining means determines that the predetermined information is contained; one of the communication devices is further provided with means for sending the received address of one of the communication device and the assigned port information to another communication device; and another communication device is further provided with means for transmitting information with one of the communication device using the received address of one of the communication device and the assigned port information.

The network system according to the second invention is characterized by being provided with: the plurality of communication devices which can communicate with each other; the address translation device having the table to translate the global address and the private address into each other, the address translation device assigns the port information to the private address to be used and relays data transmission between the communication devices; and the port information transmitting device connected between the address translation device and the external network to transmit the port information assigned by the address translation device, wherein: one of said plurality of communication devices is provided with means for sending the pseudo-packet containing an arbitrary address and the predetermined information to the address translation device before sending the information to another communication device; the address translation device is provided with means for assigning the new port information to the private address of one of the communication devices in case that the pseudo-packet is received, and means for sending the global address translated from the private address of one of the communication devices and the assigned port information to the port information transmitting device; the port information transmitting device is provided with determining means for determining whether the received communication packet contains the predetermined information, means for storing the port information corresponding to the received global address of one of the communication devices, the arbitrary address, and the private address of one of the communication devices, in case that said determining means determines that the predetermined information is contained, and means for sending the port information corresponding to the received global address of one of the communication devices to one of the communication devices; one of the communication devices is further provided with means for sending the received global address of one of the communication devices and the assigned port information to another communication device; and the port information transmitting device is further provided with determining means for determining whether a destination address and the port information contained in the communication packet received from another communication device are identical to the global address and the port information of one of the communication devices stored therein, and means for sending the communication packet to one of the communication devices in case that said determining means determines that they are identical.

The network system according to the third invention is characterized in that, in the second invention, the port information transmitting device is provided with means for generating the new communication packet using the received communication packet as the data part and by adding the stored global address and the stored port information of one of the communication devices as the destination address, in case that it is determined that the destination address and the port information of the received communication packet from another communication device are identical to the stored global address and the stored port information of one of the communication devices, and means for sending the newly generated communication packet to one of the communication devices.

The network system according to the fourth invention is characterized in that, in the second or third invention, the port information transmitting device is provided with determining means for determining whether the pseudo-packet contains memory erase information to erase the information stored in the memory, and means for erasing the information stored in the memory in case that when said determining means determines that the memory erase information is contained.

The network system according to the fifth invention is characterized in that, in any one of the first to fourth inventions, the pseudo-packet is sent at a certain time interval.

The communication method according to the sixth invention is characterized by using: the plurality of communication devices which can communicate with each other; the address translation device having the table to translate the global address and the private address into each other, the address translation device assigns the port information to the private address to be used and relays data transmission between the communication devices; and the port information transmitting device connected between the address translation device and the external network to transmit the port information assigned by the address translation device, wherein: one of the communication devices sends the pseudo-packet containing the address of another communication device and the predetermined information, before sending the information to another communication device, to the port information transmitting device via the address translation device; the address translation device assigns the new port information to the pseudo-packet address of one of the communication devices, and sends the address of one of the communication devices and the assigned port information to the port information transmitting device; the port information transmitting device determines whether the received communication packet contains the predetermined information, and sends the port information corresponding to the received address of one of the communication devices in case that it is determined that the predetermined information is contained; one of the communication devices sends the received address of one of the communication devices and the assigned port information to another communication device; another communication device transmits the information with one of the communication devices using the received address of one of the communication devices and the assigned port information.

The communication method according to the seventh invention is characterized by using: the plurality of communication devices which can communicate with each other; the address translation device having the table to translate the global address and the private address into each other, the address translation device assigns the port information to the private address to be used and relays data transmission between the communication devices; and the port information transmitting device connected between the address translation device and the external network to transmit the port information assigned by the address translation device, wherein: one of the communication devices sends the pseudo-packet containing the arbitrary address and the predetermined information to the address translation device before sending information to another communication device; the address translation device assigns the new port information to the private address of one of the communication devices when the pseudo-packet is received, and sends the global address translated from the private address of one of the communication devices and the assigned port information to the port information transmitting device; the port information transmitting device determines whether the received communication packet contains the predetermined information, stores the port information corresponding to the received global address of one of the communication devices, the arbitrary address, and the private address of one of the communication devices, when determined that the predetermined information is contained, and sends the port information corresponding to the received global address of one of the communication devices to one of the communication devices; one of the communication devices sends the received global address of one of the communication devices and the assigned port information to another communication device; and the port information transmitting device determines whether the destination address and the port information contained in the communication packet received from another communication device are identical to the global address and the port information of one of the communication devices stored therein, and sends the communication packet to one of the communication devices when determined that they are identical.

The communication method according to the eighth invention is characterized in that, in the seventh invention, the port information transmitting device generates the new communication packet using the received communication packet as the data part and by adding the stored global address and the stored port information of one of the communication device as the destination address, in case that determined that the destination address and the port information of the received communication packet from another communication device are identical to the stored global address and the stored port information of one of the communication devices, and sends the newly generated communication packet to one of the communication devices.

The communication method according to the ninth invention is characterized in that, in the seventh or eighth invention, the port information transmitting device determines whether the pseudo-packet contains the memory erase information to erase the information stored in the memory, and erases the information stored in the memory in case that said determining means determines that the memory erase information is contained.

The communication method according to the tenth invention is characterized in that, in any one of the sixth to ninth inventions, the pseudo-packet is sent at a certain time interval.

In the first or sixth invention, upon execution of the P2P application between the communication devices, the pseudo-packet containing the address of another communication device and the predetermined information is sent to the port information transmitting device via the address translation device before one of the communication devices sends the information to another communication device. After reception of the communication packet, the port information transmitting device determines whether the predetermined information is contained, and sends back the port information (port number) corresponding to one of the communication devices address to one of the communication devices in case it is that determined that the predetermined information is contained. One of the communication devices sends back the received port information to another communication device. In other words, it is sent to another communication device as an UDP binding address. The transmission is executed using, for example, an SIP (Session Initiate Protocol) as a signaling protocol. Another communication device transmits the information with one of the communication devices using the received port information. Consequently, the information of the port number usable for communication, acquired by sending the pseudo-packet and stored in the NAT table of the NAT device, can be reliably transmitted to the communication device on the other side of the P2P application execution. Therefore, in case that a different port number is newly assigned upon transmission of the packet to a different address, as in the case where the NAT device is provided with a symmetric NAT, the P2P application can be reliably executed.

In the second or seventh invention, upon execution of the P2P application between the communication devices, the pseudo-packet containing the arbitrary address as the destination address and the predetermined information is sent to the port information transmitting device via the address translation device before one of the communication devices sends the information to another communication device. After reception of the pseudo-packet, the port information transmitting device determines whether the predetermined information is contained, and stores the address (global address) translated by the address translation device of one of the communication devices and the corresponding port information (port number) in the memory and sends them back to one of the communication devices in case that it is determined that the predetermined information is contained. One of the communication devices sends back the received global address and the port information to another communication device. In other words, it is sent to another communication device as the UDP binding address. The transmission is executed using, for example, the SIP (Session Initiate Protocol) as the signaling protocol. Another communication device sends the communication packet containing the global address of one of the communication devices as the destination using the received global address and port information. After reception of the communication packet containing the global address of one of the communication devices as the destination, the port information transmitting device determines whether the address and the port information contained in the communication packet are identical to the address and the port information stored in the memory, and sends the communication packet to one of the communication devices in case that determined that they are identical. Consequently, in case that the global address of the destination is unknown, the information of the port usable for communication, acquired by sending the pseudo-packet designating an arbitrary destination address and stored in the NAT table of the NAT device, can be reliably transmitted to the communication device on the other side of the P2P application execution. Therefore, when a different transmission port is newly assigned upon transmission of the packet to a different address, as in the case where the NAT device is provided with the symmetric NAT, the P2P application can be executed using the address and the corresponding port information (port number) which solve the NAT problem, that is, which can pass through the NAT device.

In the third or eighth invention, upon reception of the communication packet containing the global address of one of the communication devices as the destination, the port information transmitting device determines whether the address and the port information contained in the communication packet are identical to the address and the port information stored in the memory, and, in case that it is determined that they are identical, generates the new communication packet using the received communication packet as the data part and by adding the stored global address and port information of one of the communication devices as the destination address and sends the newly generated communication packet to one of the communication device. Consequently, in case that the global address of the destination is unknown, the information of the port usable for communication, acquired by sending the pseudo-packet designating the arbitrary destination address and stored in the NAT table of the NAT device, can be reliably transmitted to the communication device on the other side of the P2P application execution. Therefore, when a different transmission port is newly assigned upon transmission of the packet to a different address, as in the case where the NAT device is provided with the symmetric NAT, the P2P application can be executed using the address and the corresponding port information (port number) which solve the NAT problem, that is, which can pass through the NAT device.

In the fourth or ninth invention, the port information transmitting device determines whether the pseudo-packet contains the memory erase information to erase the information stored in the memory, and, in case that it is determined that the memory erase information is contained, the information stored in the memory is erased. Consequently, the port information corresponding to the arbitrary address becomes less likely to be identical to the newly assigned port information, allowing the P2P application being executed more reliably.

In the fifth or tenth invention, the pseudo-packet is sent at a certain time interval. Consequently, it prevents the port information newly assigned to the NAT device to be erased before another new port information being assigned, allowing the P2P application to be executed continuously.

According to the present invention, the information of the port usable for communication, acquired by sending the pseudo-packet and stored in the NAT table of the NAT device, can be reliably transmitted to the communication device on the other side of the P2P application execution. Therefore, when a different transmission port is newly assigned upon transmission of the packet to a different address, as in the case where the NAT device is provided with the symmetric NAT, the P2P application can be executed using the address and the corresponding port information (port number) which solve the NAT problem, that is, which can pass through the NAT device.

Moreover, according to the present invention, the port information corresponding to the arbitrary address becomes less likely to be identical to the newly assigned port information, allowing the P2P application being executed more reliably.

Furthermore, according to the present invention, it prevents the port information newly assigned to the NAT device to be erased before another new port information being assigned, allowing the P2P application to be executed continuously.

The above and further objects and features of the invention will more fully be apparent from the following detailed description with accompanying drawings.

BRIEF DESCRIPTION OF THE DRAWINGS

FIG. 9 is a flowchart illustrating a process sequence by the CPU of the port information transmitting device of the network system according to the second embodiment of the present invention;

DETAILED DESCRIPTION OF THE PREFERRED EMBODIMENTS

In the foregoing method using the UPnP standard, there has been a problem that, a P2P application can not be executed when an NAT device is not compliant with the UPnP standard because of the low market diffusion of routers compliant with the UPnP standard.

Moreover, in case that the STUN standard is used to transmit a UDP packet from a communication device as a source of the P2P application to the other communication device on the Internet, a port number assigned to an NAT device upon communication with a STUN server may be different with the port number of the source. In this case, there has been a problem that there is no means for the other communication devices to get the newly assigned port number, resulting in the NAT problem being unsolved.

The present invention, being made in view of the foregoing circumstances, is intended to provide a network system and a communication method for solving the NAT problem to functionalize the P2P application in case that new port information (number) is assigned to the NAT device.

Moreover, the present invention is intended to provide the network system and the communication method which enable the P2P application to be executed continuously by preventing the port information (number) newly assigned to the NAT device to be erased.

Furthermore, the present invention is intended to provide the network system and the communication device which can prevent the address translation to malfunction by erasing such as the port information (number), a global address, and a private address assigned to the NAT device from a memory. The foregoing objects are realized by the following embodiments.

First Embodiment

Figure 1:
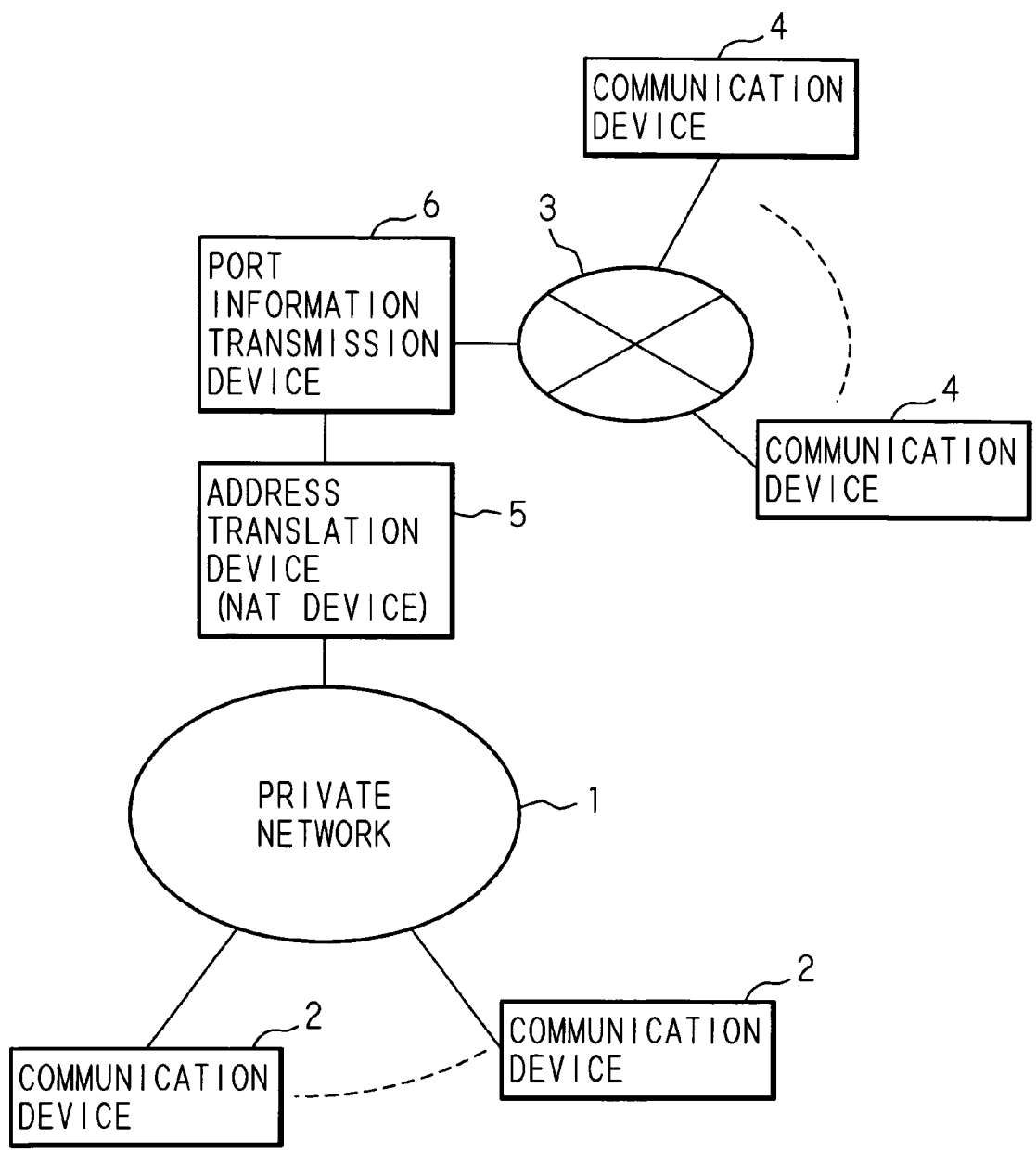
FIG. 1 is a block diagram illustrating an overall configuration of a network system according to a first embodiment of the present invention.

FIG. 1 is a block diagram illustrating an overall configuration of the network system according to a first embodiment of the present invention. In the first embodiment, the case is assumed where the P2P communication is established between a communication device 2 belonging to a private network 1 where a LAN environment is built and a communication device 4 connected to the private network 1 via a network 3, such as the Internet. Therefore, global addresses are assigned to each of the communication devices 4, 4, . . . , while a single global address is assigned to such as a proxy server within the private network 1.

Meanwhile, unique private addresses are assigned to each of the communication devices 2, 2, . . . within the private network 1 to enable communication with the external network using the single global address, the private address being translated into the global address by an address translation device (NAT device) 5 to communicate with the communication devices 4, 4, . . . outside the private network 1. In other words, the address translation device 5 is provided with a network address translation table (hereinafter, referred to as the NAT table) 521 for translating the private address into the global address, or vice versa.

Moreover, the address translation device 5 also serves as the so-called NAT device to assign a port number as a sub-address of the global address, allowing the plurality of communication devices 2, 2, ... within the same private network 1 being connected simultaneously to the network 3 such as the Internet. The address translation device 5 assigns the single port number to a source address of a communication packet passing therethrough.

The present invention is characterized in that the foregoing NAT problem is solved by providing a port information transmitting device 6 between the address translation device 5 and the network 3 such as the Internet, allowing the port number (port information) to be transmitted between the communication device 2 within the private network 1 and the communication device 4 outside the private network 1.

Figure 2:
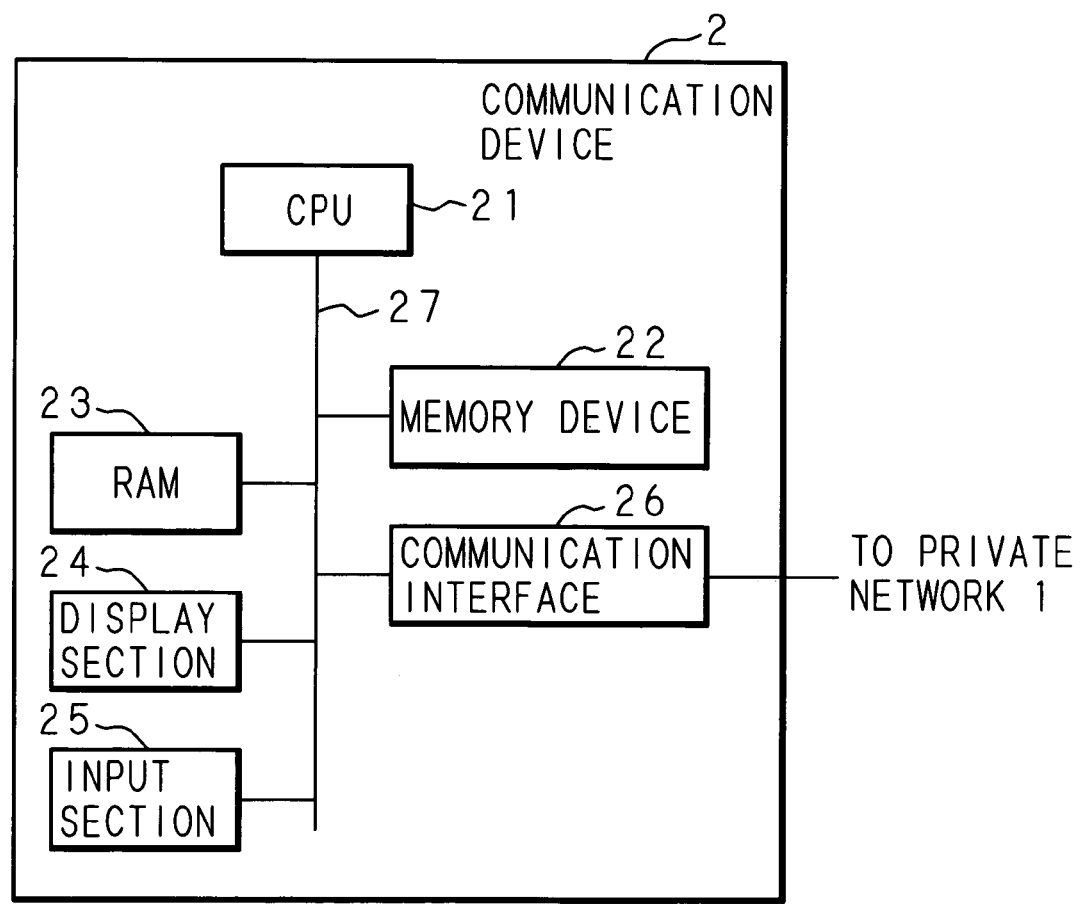
FIG. 2 is a block diagram illustrating a configuration of a communication device within a private network.

FIG. 2 is a block diagram illustrating a configuration of the communication device 2 within the private network 1. The communication device 2 is configured by at least a CPU 21, a memory device 22, a RAM 23, a display section 24, an input section 25, and a communication interface 26, wherein the memory device 22 stores an operating system and a communication program, as well as the global address (address information of the other side of the communication), the private address or the like.

The CPU 21 is connected with the respective foregoing sections of the hardware of the communication device 2 via an internal bus 27 to control those sections of the hardware respectively and execute various software functions in accordance with a control program stored in the memory device 22 such as a hard disk. The RAM 23 is for example a DRAM, storing temporary data generated upon execution of software.

The display section 24 is for example a liquid crystal display device or a CRT display, for displaying a communication status, a window to prompt a user to input operations, or image data. The input section 25 is an input medium such as a mouse or a keyboard equipped with character keys, ten keys, and various function keys required for operating the communication device 2.

The communication interface 26 is connected to the internal bus 27 to transmit communication packet information to/from the external devices via the private network 1.

Figure 3:
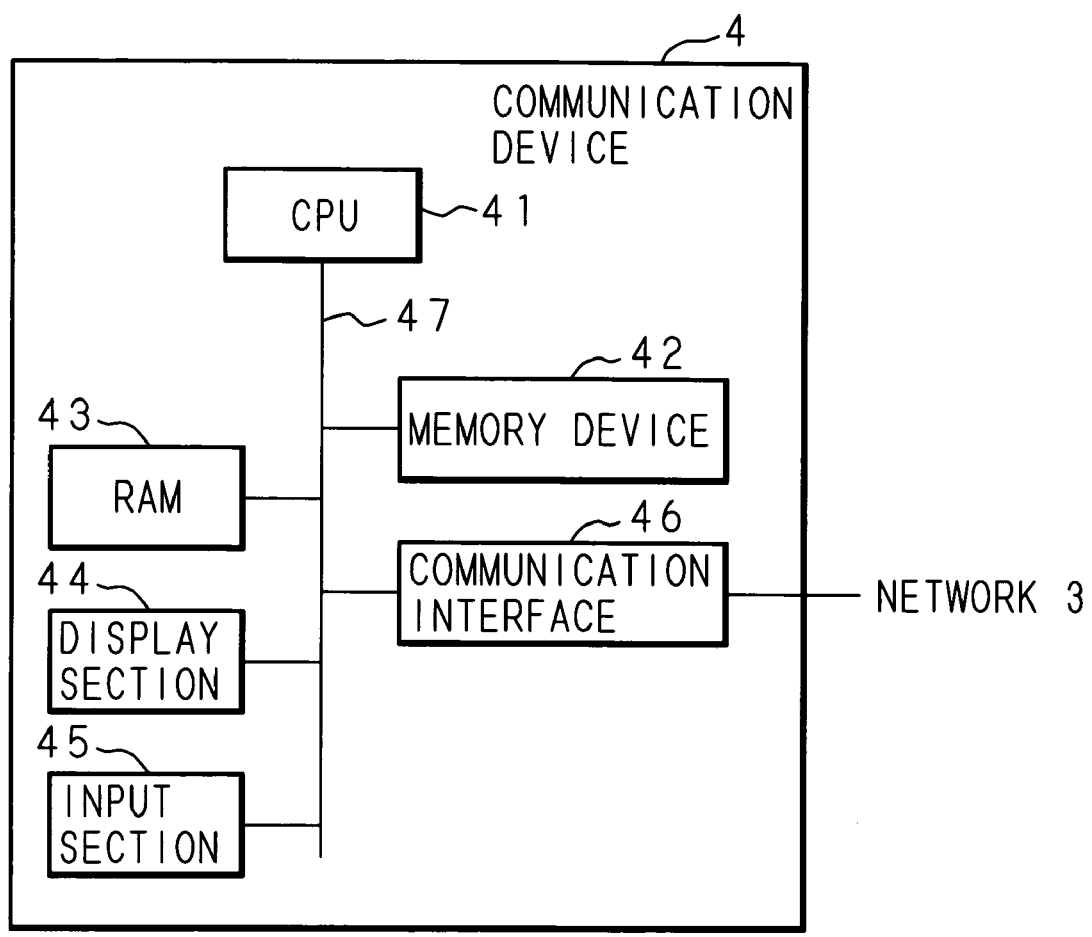
FIG. 3 is a block diagram illustrating a configuration of the communication device connected to a network outside the private network.

FIG. 3 is a block diagram illustrating a configuration of the communication device 4 connected to the network such as the Internet outside the private network 1. The communication device 4 is configured by at least a CPU 41, a memory device 42, a RAM 43, a display section 44, an input section 45, and a communication interface 46, wherein the memory device 42 stores the operating system and the communication program, as well as the global address (address information of the other side of the communication).

The CPU 41 is connected with the respective foregoing sections of the hardware of the communication device 4 via an internal bus 47 to control those sections of the hardware respectively and execute various software functions in accordance with the control program stored in the memory device 42 such as the hard disk. The RAM 43 is for example the DRAM, storing the temporary data generated upon execution of the software.

The display section 44 is for example the liquid crystal display device or the CRT display, for displaying the communication status, the window to prompt the user to input the operations, or the image data. The input section 45 is the input medium such as the mouse or the keyboard equipped with the character keys, the ten keys, and the various function keys required for operating the communication device 4.

The communication interface 46 is connected to the internal bus 47 to transmit the communication packet information to/from the external devices via the network 3.

Figure 4:
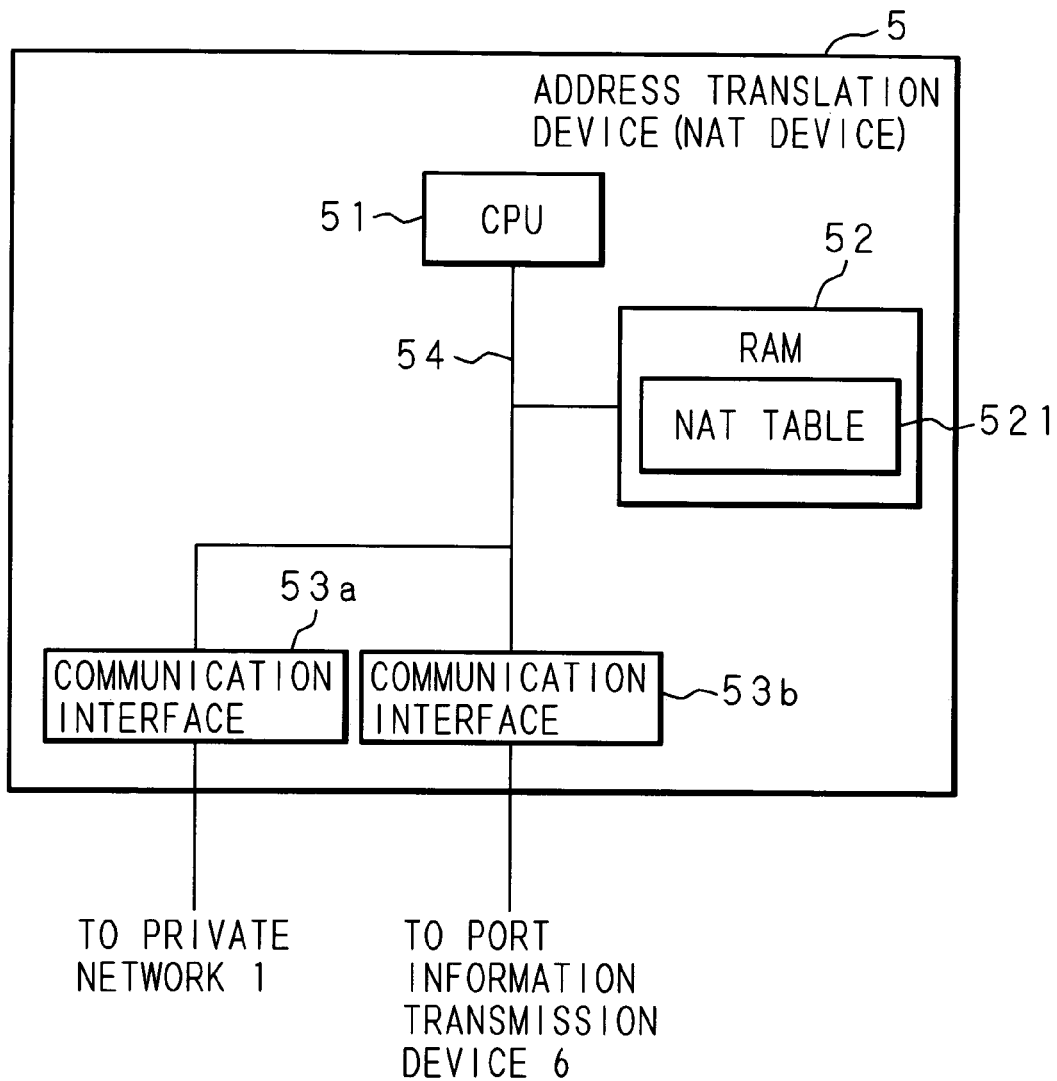
FIG. 4 is a block diagram illustrating a configuration of an address translation device (NAT device)

FIG. 4 is a block diagram illustrating a configuration of the address translation device (NAT device) 5. The address translation device 5 is configured by at least a CPU 51, a RAM 52, and communication interfaces 53*a* and 53*b*, wherein the RAM 52 is provided with an NAT table 521 storing the global address and the private address being corresponded to each other.

The CPU 51 is connected with the respective foregoing sections of the hardware of the address translation device 5 via an internal bus 54 to control those sections of the hardware respectively and translate a destination address of the communication packet from the global address to the private address, or vice versa, in accordance with the NAT table 521 stored in the RAM 52. Moreover, the NAT table is updated upon each transmission of the communication packet. In this embodiment, a synchronous NAT is employed which assigns different port numbers to the respective source addresses when different source addresses are used.

The RAM 52 stores the temporary data generated upon execution of the software as well. The communication interface 53*a* is connected to the private network 1 to relay the communication packet. The communication interface 53*b* is connected to the port information transmitting device 6 to relay the communication packet and send the information of the port number assigned to the source address to the port information transmitting device 6.

Figure 5:
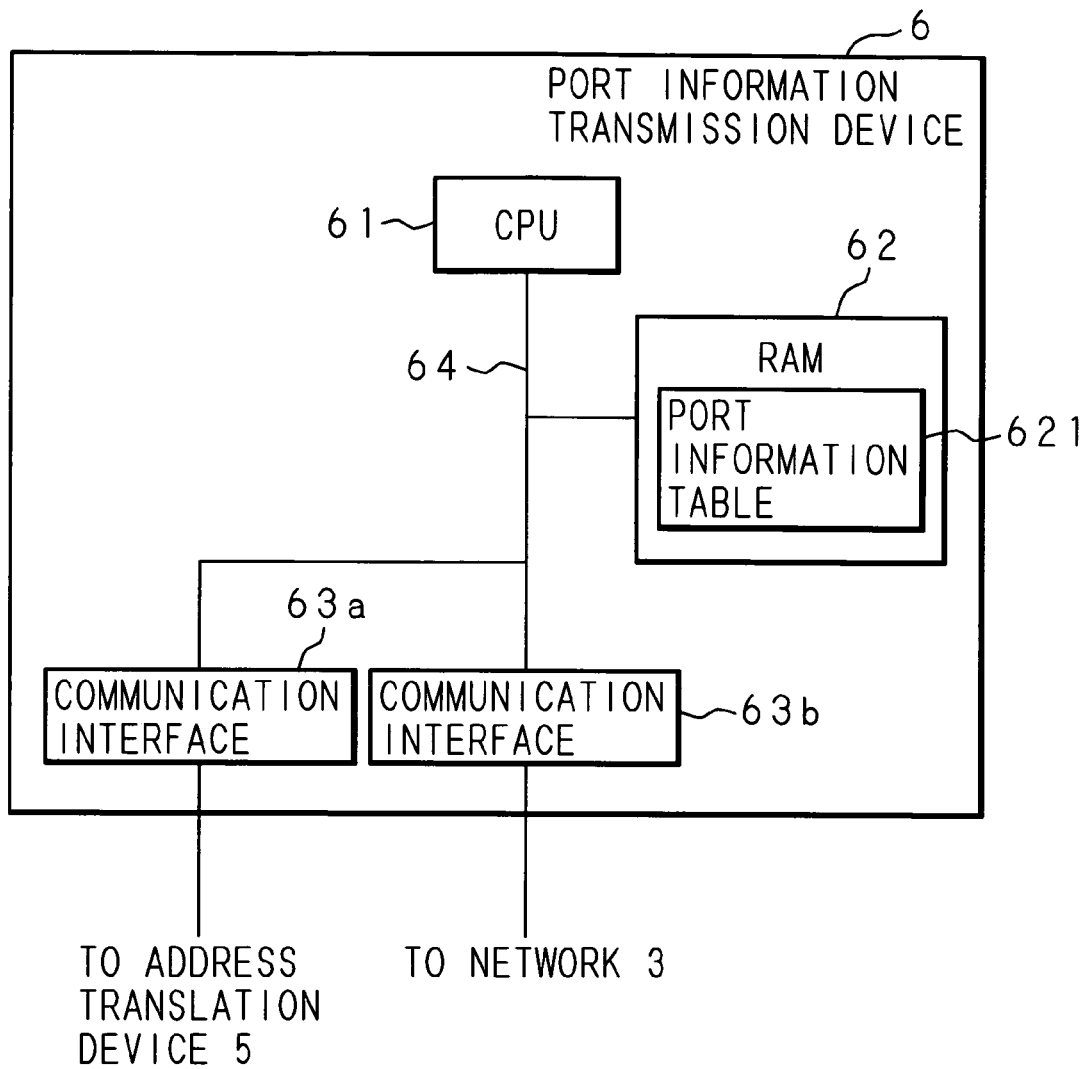
FIG. 5 is a block diagram illustrating a configuration of a port information transmitting device.

FIG. 5 is a block diagram illustrating a configuration of the port information transmitting device 6. The port information transmitting device 6 is configured by at least a CPU 61, a RAM 62, and communication interfaces 63*a* and 63*b*, wherein the RAM 62 is provided with a port information table 621 for storing address information and the port number received from the address translation device 5.

The CPU 61 is connected with the respective foregoing sections of the hardware of the port information transmitting device 6 via an internal bus 64 to control those sections of the hardware respectively and execute a process to enable the P2P application between the communication devices 2 and 4 using the port information table 621 stored in the RAM 62.

The RAM 62 stores the temporary data generated upon execution of the software as well. The communication interface 63*a* is connected to the address translation device 5. The communication interface 63*b* is connected to the network 3 such as the Internet.

Figure 6:
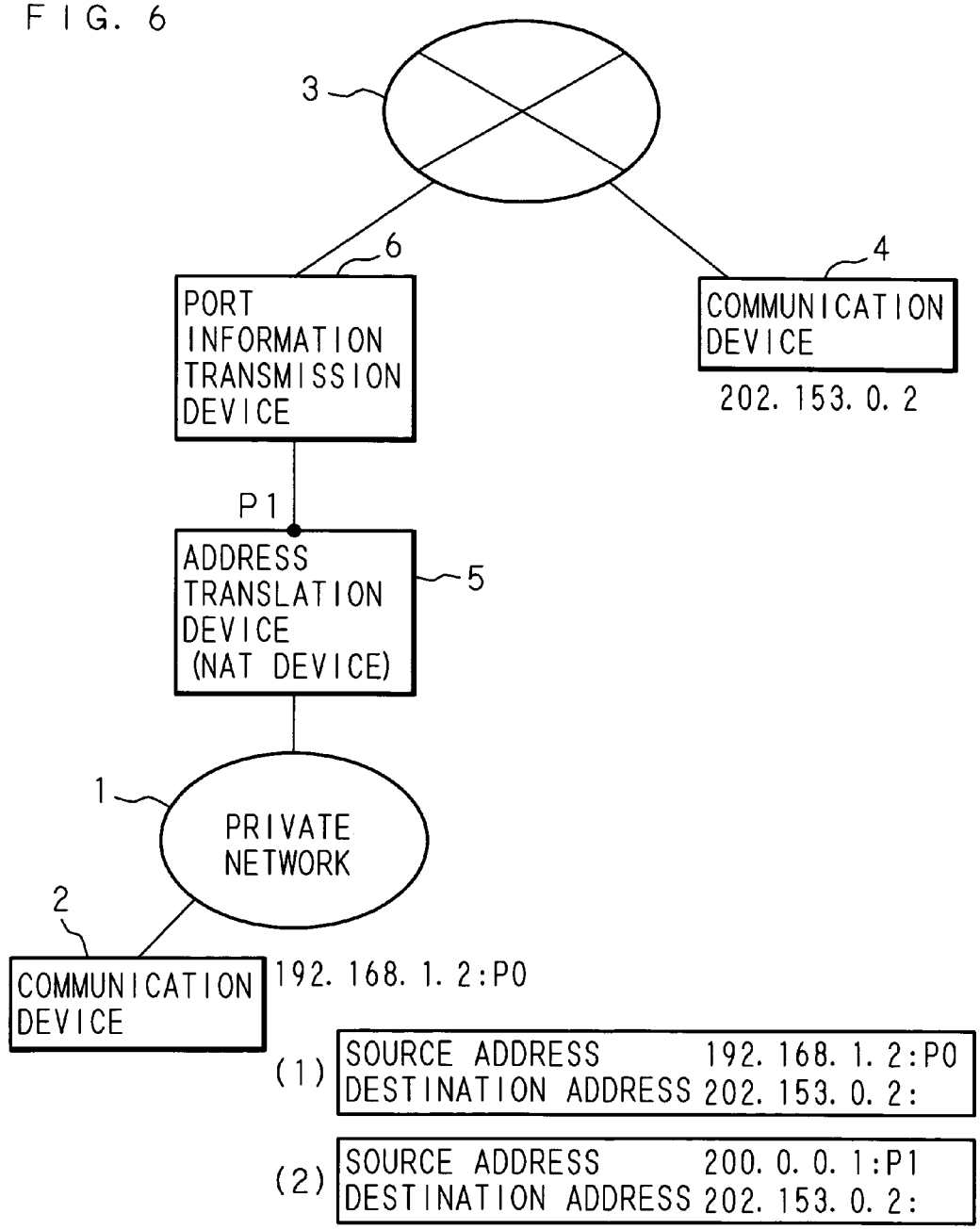
FIG. 6 is a diagram illustrating the relationship between an address and a port number in case that data is communicated from the communication device within the private network of the network system as a source to the communication device outside the private network as a destination according to the first embodiment of the present invention.

Hereinafter, the communication process between the communication devices 2 and 4 in the network system having the foregoing configurations will be described. FIG. 6 is a diagram illustrating the relationship between the address and the port number in case that the data is communicated from the communication device 2 within the private network 1 of the network system as the source to the communication device 4 outside the private network 1 as the destination according to the first embodiment of the present invention.

Here, the address 192.168.1.2 is set as the private address of the communication device 2, while the address 202.153.0.2 is set as the global address of the communication device 4. Usually, the private address and the port number P0 of the communication device 2 are set to be the source address and the address of the communication device 4 to be the destination address, as shown in (1), to send the communication packet containing the data to communicate. In the first embodiment, the pseudo-packet is sent with the information being set which indicates the packet is the pseudo-packet, for example a 32-bit or 64-bit constant numeric value, in the data part of the communication packet in the form of (1).

When the communication packet transmitted from the communication device 2 passes through the address translation device 5, a port number P1 differing from P0 is assigned to the private address (source address) 192.168.1.2 of the communication device 2 and stored in the RAM 52. The address translation device 5 translates the source address 192.168.1.2 into the global address 200.0.0.1 using the NAT table 521 to translate the address contained in the communication packet into the address shown in (2), thereby the communication packet, as well as the data part thereof, is sent to the port information transmitting device 6.

The port information transmitting device 6 analyzes the received communication packet to determine whether the data part contains the predetermined constant numeric value. When the port information transmitting device 6 determines that the data part of the received communication packet contains the predetermined constant numeric value, it is determined that the received communication packet is the pseudo-packet, resulting in a response packet being sent back to the source address 200.0.0.1:P1.

The response packet also passes through the address translation device 5. Consequently, the address thereof is translated into the private address using the NAT table 521 to translate the source address 200.0.0.1:P1 into 192.168.1.2:P0. Since the RAM 52 stores the information that the port number P0 corresponds to the private address 192.168.1.2, the response packet is sent to the communication device 2.

After reception of the response packet, the communication device 2 sends the information indicating that the port number P1 is available to the communication device 4 for using the port number P1 contained in the response packet as the port number for the P2P communication with the communication device 4. In other words, it is sent to the communication device as an UDP binding address. The transmission is executed using, for example, a SIP (Session Initiate Protocol) as a signaling protocol. Consequently, the communication device 4 can get the port number usable in the data transmission with the communication device 2 on the other side of communication, allowing the so-called NAT problem of the symmetric NAT being solved. In other words, the communication device 4 sends the data with the address 200.0.0.1:P1, which is set as the destination address using the global address 200.0.0.1 of the communication device 2 and the port number acquired by the signaling protocol, allowing the data to be sent to the communication device 2 without causing the NAT problem.

Figure 7:
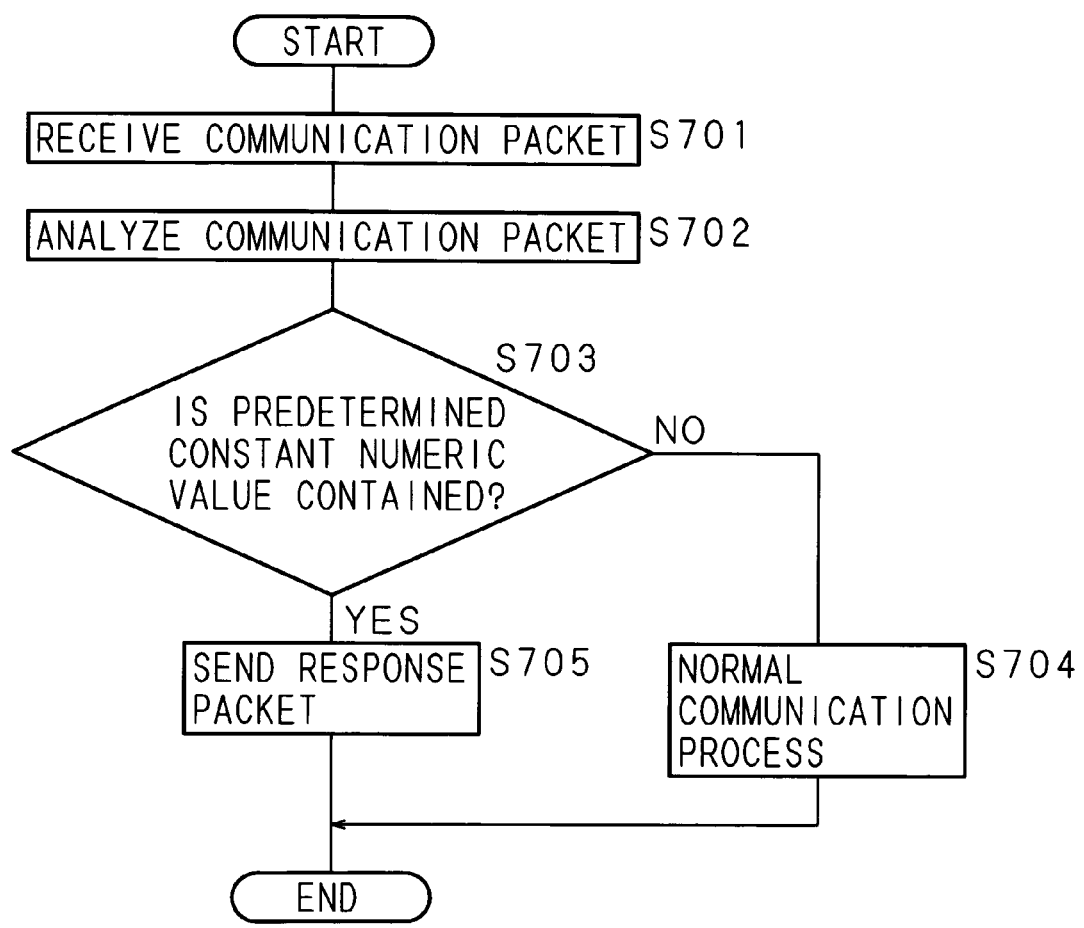
FIG. 7 is a flowchart illustrating a process sequence by a CPU of the port information transmitting device of the network system according to the first embodiment of the present invention.

FIG. 7 is a flowchart illustrating a process sequence by the CPU 61 of the port information transmitting device 6 of the network system according to the first embodiment of the present invention. The CPU 61 of the port information transmitting device 6 receives the communication packet from the communication device 2 (Step S701). The CPU 61 analyzes the received communication packet (Step S702) and then determines whether the data part thereof contains the predetermined constant numeric value (Step S703).

When determined that the predetermined constant numeric value is not contained (Step S703: NO), the CPU 61 determines that the packet is the normal communication packet and executes the normal communication process (Step S704). When determined that the predetermined constant numeric value is contained (Step S703: YES), the CPU 61 determines that the packet is the pseudo-packet and sends the response packet with the address 200.0.0.1:P1, which is set as the destination address using the global address of the communication device 2 and the port number P1, to the communication device 2 (Step S705).

The response packet passes through the address translation device 5 which translates the destination address into the private address, thereby the destination address is set to 192.168.1.2:P1. Since the RAM 52 of the address translation device 5 stores the information that the port number P1 corresponds to 192.168.1.2, the communication packet is reliably sent to the communication device 2.

Since the transmitting device 2 sends the information indicating that the port number P1 is used for the P2P communication with the communication device 4 using the SIP, the communication device 4 can get the port number usable in the data transmission with the communication device 2 on the other side of communication, thereby the so-called NAT problem of the synchronous NAT can be solved.

Here, the port number assigned in the address translation device 5 is erased from the RAM 52 after a certain period of time. Therefore, to perform the P2P communication continuously between the communication devices, it is preferable that the pseudo-packet is sent from the communication device 2 at a certain time interval shorter than the period of time for the port number being erased from the RAM 52. Consequently, the port number usable for the P2P communication between the communication devices can be acquired continuously, allowing the P2P communication being performed uninterruptedly.

Second Embodiment

Figure 8:
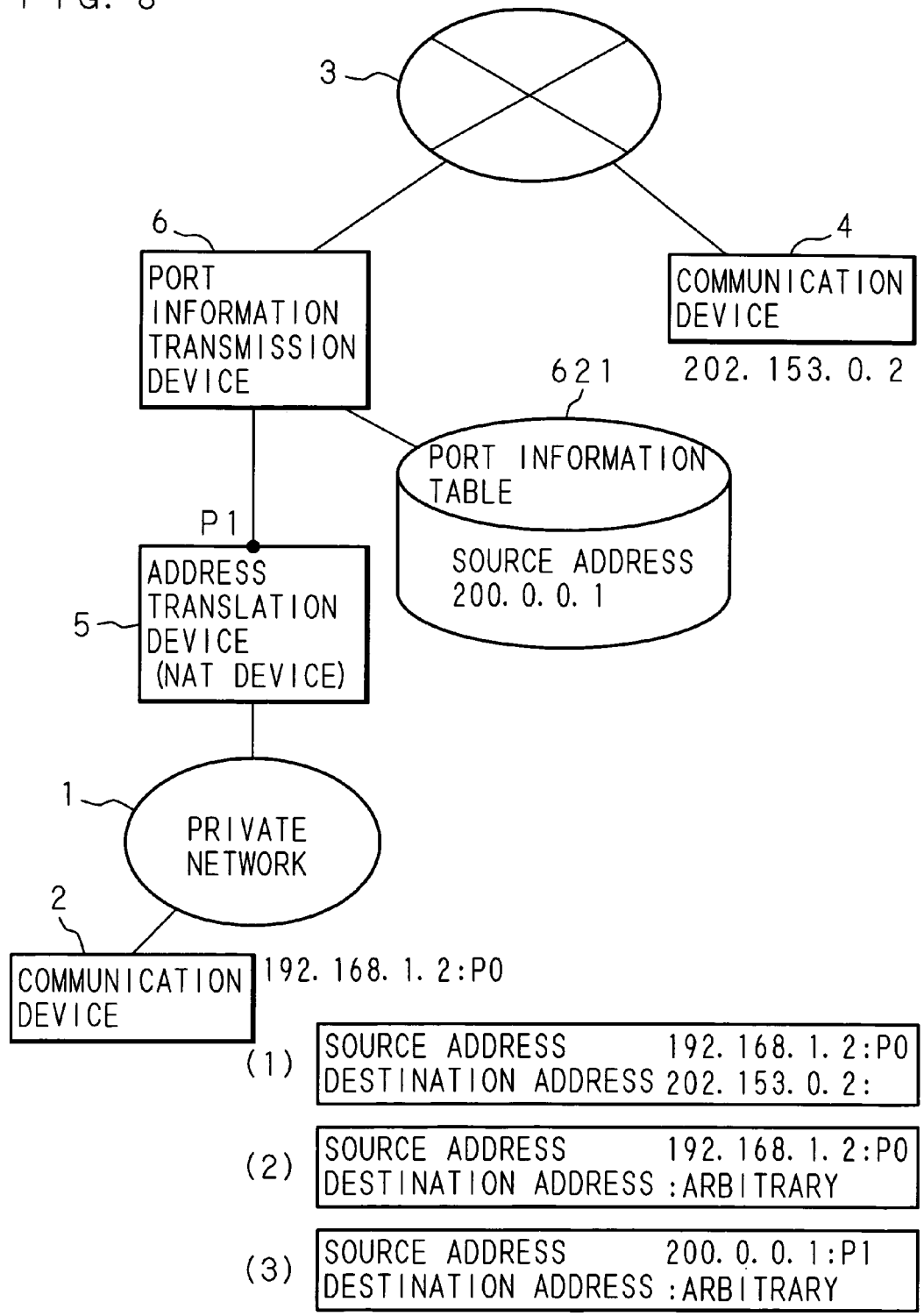
FIG. 8 is a diagram illustrating the relationship between the address and the port number in case that the data is communicated from the communication device within the private network of the network system as the source to the communication device outside the private network as the destination according to a second embodiment of the present invention.

The overall configuration of the network system according to a second embodiment of the present invention is similar to that of the first embodiment. In the second embodiment, it is characterized in that the destination of the pseudo-packet is the arbitrary address. FIG. 8 is a diagram illustrating the relationship between the address and the port number in case that the data is communicated from the communication device 2 within the private network 1 of the network system as the source to the communication device 4 outside the private network 1 as the destination according to the second embodiment of the present invention.

Here, the address 192.168.1.2 is set as the private address of the communication device 2, while the address 202.153.0.2 is set as the global address of the communication device 4. Usually, the private address and the port number P0 of the communication device 2 are set to be the source address and the address of the communication device 4 to be the destination address, as shown in (1), to send the communication packet containing the data to communicate. In the second embodiment, as shown in (2), the private address and the port number P0 of the communication device 2 are set as the source address while the arbitrary address, e.g., 100.0.0.1, is set as the destination address to transmit the pseudo-packet with the information being set which indicates the packet is the pseudo-packet, for example the 32-bit or 64-bit constant numeric value, in the data part of the communication packet.

When the communication packet transmitted from the communication device 2 passes through the address translation device 5, the port number P1 differing from P0 is assigned to the private address (source address) 192.168.1.2 of the communication device 2 and stored in the RAM 52. The address translation device 5 translates the source address 192.168.1.2 into the global address 200.0.0.1 using the NAT table 521 to translate the address contained in the communication packet into the address shown in (3), thereby the communication packet, as well as the data part thereof, is sent to the port information transmitting device 6.

The port information transmitting device 6 analyzes the received communication packet to determine whether the data part contains the predetermined constant numeric value. When the port information transmitting device 6 determines that the data part of the received communication packet contains the predetermined constant numeric value, it is determined that the received communication packet is the pseudo-packet, resulting in the source address 200.0.0.1:P1 and the destination address (arbitrary) being stored in the port information table 621. The port information transmitting device 6 sends back the response packet to the source address 200.0.0.1:P1.

The response packet also passes through the address translation device 5. Consequently, the address thereof is translated into the private address using the NAT table 521 to translate the source address 200.0.0.1:P1 into 192.168.1.2: P1. Since the RAM 52 stores the information that the port number P1 corresponds to the private address 192.168.1.2, the response packet is sent to the communication device 2 without causing the NAT problem.

After reception of the response packet, the communication device 2 sends the global address 200.0.0.1 of the communication device 2 and the corresponding port number P1 to the communication device 4 for using the port number P1 contained in the response packet as the port number for the P2P communication with the communication device 4. In other words, it is sent to the communication device as the UDP binding address. The transmission is executed using, for example, the SIP (Session Initiate Protocol) as the signaling protocol. Consequently, the communication device 4 can get the global address and the port number usable in the data transmission with the communication device 2 on the other side of communication, allowing the so-called NAT problem of the synchronous NAT being solved.

In other words, the communication device 4 sends the data with the address 200.0.0.1:P1, which is set as the destination address using the global address 200.0.0.1 of the communication device 2 and the port number P1. The communication packet transmitted from the communication device 4 passes through the port information transmitting device 6.

The port information transmitting device 6 determines whether the global address and the port number of the received communication packet are stored in the port information table 621 as the source address. When determined that the global address and the port number of the received communication packet are stored in the port information table 621 as the source address, the port information transmitting device 6 determines that the NAT problem does not occur with the received communication packet and passes the packet to the address translation device 5, which in turn translates the global address (destination address) 200.0.0.1 of the communication packet into the private address 192.168.1.2 to send the packet to the communication device 2.

FIG. 9 is a flowchart illustrating the process sequence by the CPU 61 of the port information transmitting device 6 of the network system according to the second embodiment of the present invention. The CPU 61 of the port information transmitting device 6 receives the communication packet from the communication device 2 (Step S901). The CPU 61 analyzes the received communication packet (Step S902) and then determines whether the data part thereof contains the predetermined constant numeric value (Step S903).

When determined that the predetermined constant numeric value is contained (Step S903: YES), the CPU 61 determines that the packet is the pseudo-packet and stores the address containing the global address of the communication device 2 translated by the address translation device 5 and the port number P1, as the destination address, in the port information table 621 (Step S904).

When determined that the predetermined constant numeric value is not contained (Step S903: NO), the CPU 61 determines whether the destination address (global address) and the corresponding port number of the received communication packet are identical to the source address (global address) and the port number stored in the port information table 621 (Step S905).

When determined that they are not identical (Step S905: NO), the CPU 61 executes the normal communication process (Step S906). Therefore, the data can not be transmitted between the communication devices unless the NAT problem is solved.

When determined that they are identical (Step S905: YES), the CPU 61 determines that the NAT problem is solved in the received communication packet, which is then sent to the communication device 2 with the destination address and the port number remaining as received (Step S907). For sending to the communication device 2, the communication packet is passed to the address translation device 5, which in turn translates the global address (destination address) 200.0.0.1 of the communication packet into the private address 192.168.1.2 and send the packet to the communication device 2.

Here, as in the first embodiment, the port number stored in the RAM 52 of the address translation device 5 is erased after a certain period of time. Therefore, in the second embodiment as well, to perform the P2P communication continuously between the communication devices, the pseudo-packet is sent to the port information transmitting device 6 at a certain time interval shorter than the period of time for the port number being erased. Consequently, the port number usable for the P2P communication between the communication devices can be acquired continuously, allowing the P2P communication being performed uninterruptedly.

Third Embodiment

Figure 10:
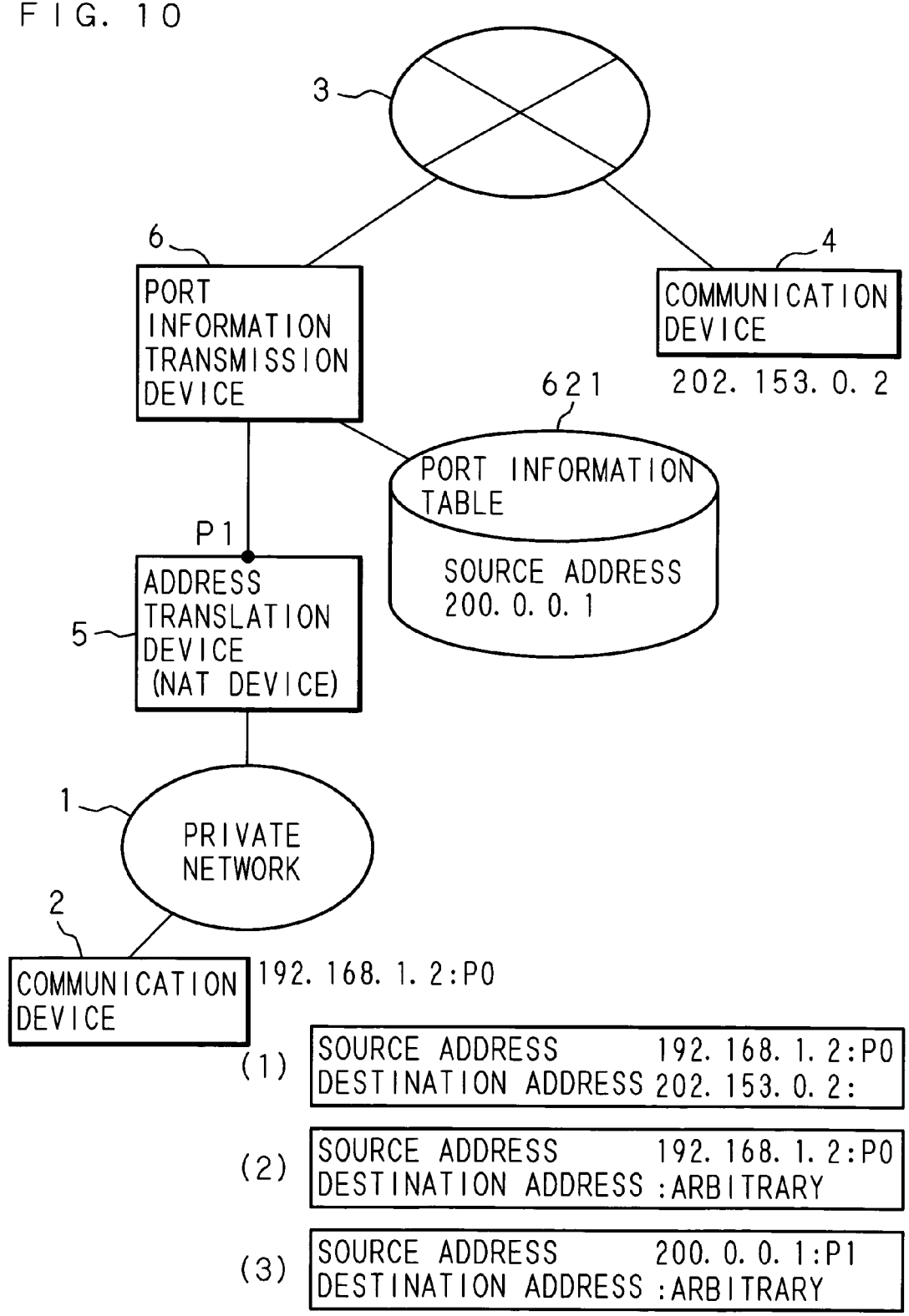
FIG. 10 is a diagram illustrating the relationship between the address and the port number in case that the data is communicated from the communication device within the private network of the network system as the source to the communication device outside the private network as the destination according to a third embodiment of the present invention.

The overall configuration of the network system according to a third embodiment of the present invention is similar to that of the first embodiment. In the third embodiment, it is characterized in that the destination of the pseudo-packet is the arbitrary address and the address information (port number information) is added sequentially to the communication packet. FIG. 10 is a diagram illustrating the relationship between the address and the port number in case that data is communicated from the communication device 2 within the private network 1 of the network system as the source to the communication device 4 outside the private network 1 as the destination according to the third embodiment of the present invention.

Here, the address 192.168.1.2 is set as the private address of the communication device 2, while the address 202.153.0.2 is set as the global address of the communication device 4. Usually, the private address and the port number P0 of the communication device 2 are set to be the source address and the address of the communication device 4 to be the destination address, as shown in (1), to send the communication packet containing the data to communicate. In the third embodiment, as shown in (2), the private address and the port number P0 of the communication device 2 are set as the source address while the arbitrary address, e.g., 100.0.0.1, is set as the destination address to transmit the pseudo-packet with the information being set which indicates the packet is the pseudo-packet, for example the 32-bit or 64-bit constant numeric value, in the data part of the communication packet.

When the communication packet transmitted from the communication device 2 passes through the address translation device 5, the port number P1 differing from P0 is assigned to the private address (source address) 192.168.1.2 of the communication device 2 and stored in the RAM 52. The address translation device 5 translates the source address 192.168.1.2 into the global address 200.0.0.1 using the NAT table 521 to translate the address contained in the communication packet into the address shown in (3), thereby the communication packet, as well as the data part thereof, is sent to the port information transmitting device 6.

The port information transmitting device 6 analyzes the received communication packet to determine whether the data part contains the predetermined constant numeric value. When the port information transmitting device 6 determines that the data part of the received communication packet contains the predetermined constant numeric value, it is determined that the received communication packet is the pseudo-packet, resulting in the source address 200.0.0.1:P1 and the destination address (arbitrary) being stored in the port information table 621. The port information transmitting device 6 sends back the response packet to the source address 200.0.0.1:P1.

The response packet also passes through the address translation device 5. Consequently, the address thereof is translated into the private address using the NAT table 521 to translate the source address 200.0.0.1:P1 into 192.168.1.2: P1. Since the RAM 52 stores the information that the port number P1 corresponds to the private address 192.168.1.2, the response packet is sent to the communication device 2 without causing the NAT problem.

After reception of the response packet, the communication device 2 sends the global address 200.0.0.1 of the communication device 2 and the corresponding port number P1 to the communication device 4 for using the port number P1 contained in the response packet as the port number for the P2P communication with the communication device 4. In other words, it is sent to the communication device as the UDP binding address. The transmission is executed using, for example, the SIP (Session Initiate Protocol) as the signaling protocol. Consequently, the communication device 4 can get the global address and the port number usable in the data transmission with the communication device 2 on the other side of communication, allowing the so-called NAT problem of the synchronous NAT being solved.

In other words, the communication device 4 sends the data with the address 200.0.0.1:P1, which is set as the destination address using the global address 200.0.0.1 of the communication device 2 and the port number P1. The communication packet transmitted from the communication device 4 passes through the port information transmitting device 6.

The port information transmitting device 6 determines whether the global address and the port number of the received communication packet are stored in the port information table 621 as the source address. When determined that the global address and the port number of the received communication packet are stored in the port information table 621 as the source address, the port information transmitting device 6 determines that the NAT problem does not occur with the received communication packet and generates the communication packet having the source address stored in the port information table 621 as the destination address with the received communication packet as a payload of the generated communication packet.

Figure 11:
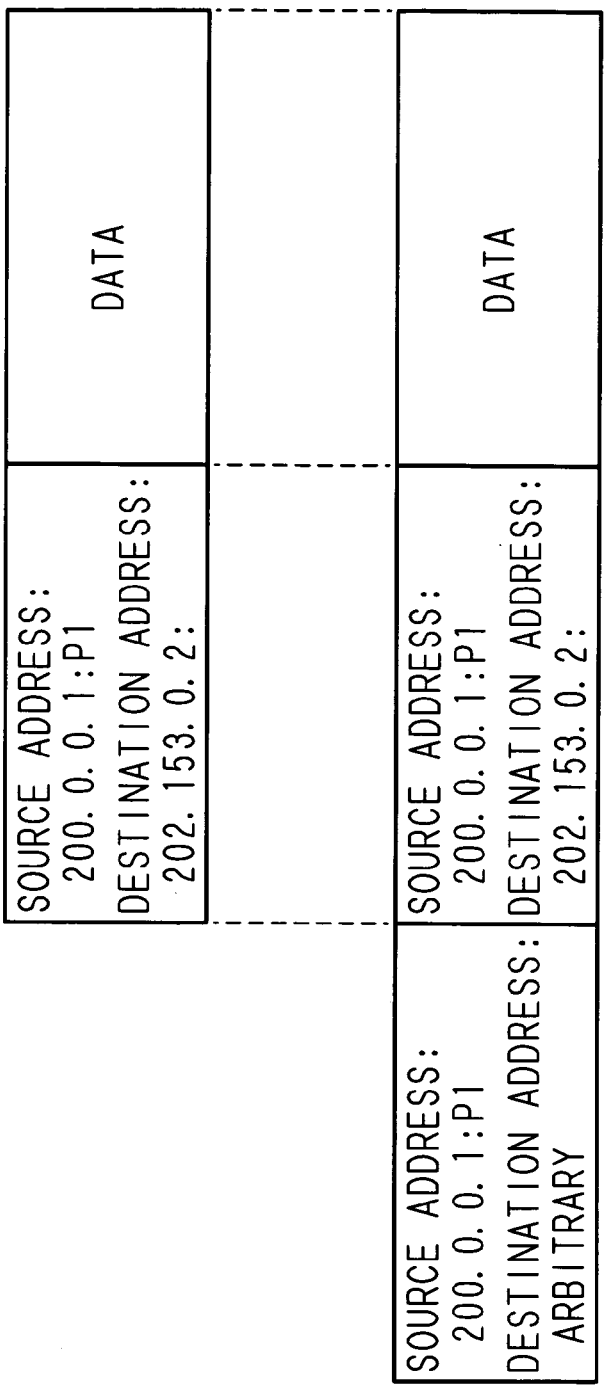
FIG. 11A is a diagram illustrating one example of a data configuration of a received communication packet.
FIG. 11B is a diagram illustrating one example of a data configuration of a newly generated communication packet.

FIG. 11A is a diagram illustrating one example of the data configuration of the received communication packet, while FIG. 11B is a diagram illustrating one example of the data configuration of the newly generated communication packet. The port information transmitting device 6 generates the new communication packet using the received communication packet as the data part without change and by adding the source address 200.0.0.1:P1 stored in the port information table 621 as the destination address. The arbitrary address is used as the source address of the newly generated communication packet.

The port information transmitting device 6 passes the newly generated communication packet to the address translation device 5, which in turn translates the global address (destination address) 200.0.0.1 of the communication packet into the private address 192.168.1.2 and send the packet to the communication device 2.

Figure 12:
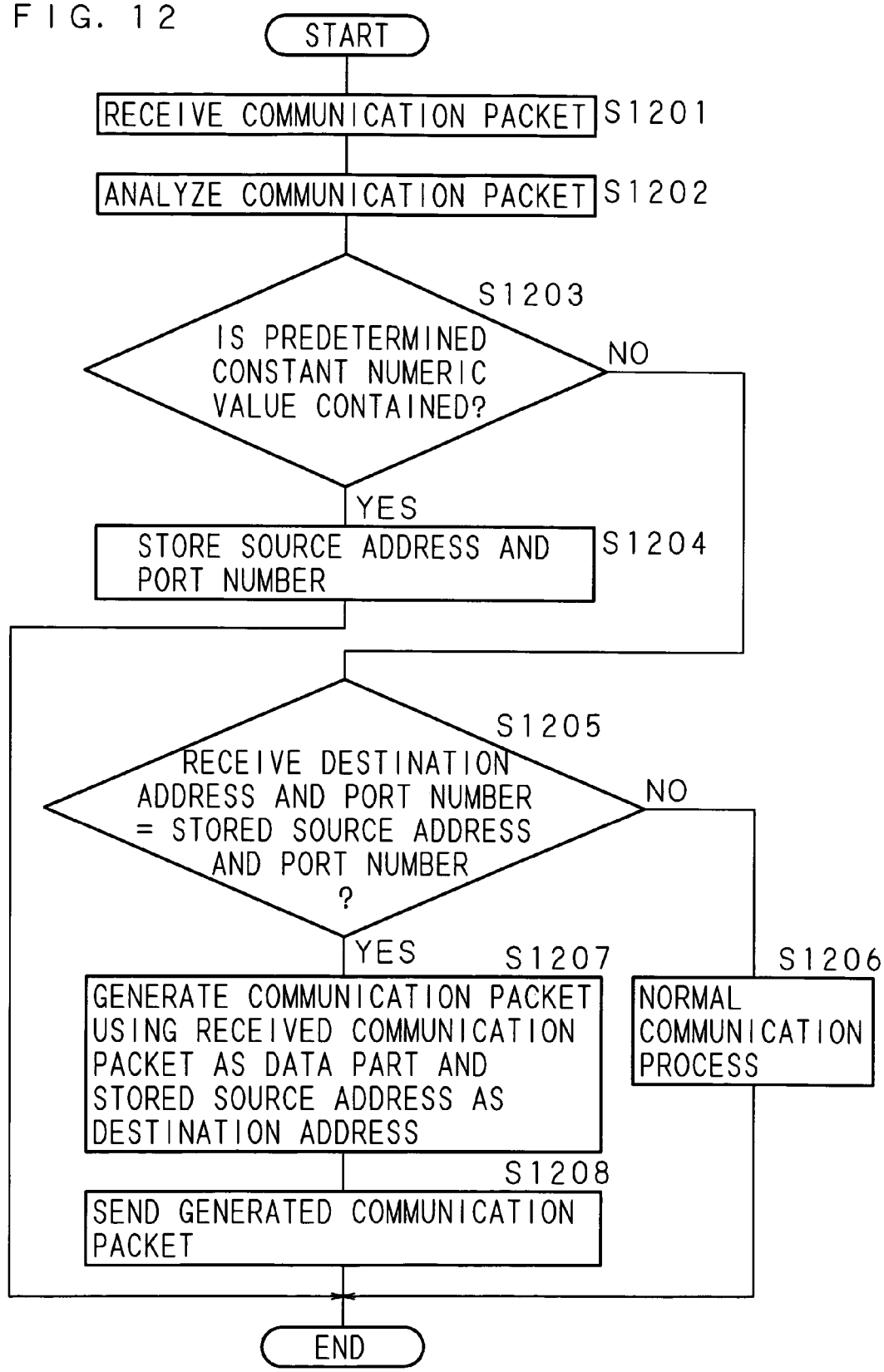
FIG. 12 is a flowchart illustrating a process sequence by the CPU of the port information transmitting device of the network system according to the third embodiment of the present invention.

FIG. 12 is a flowchart illustrating the process sequence by the CPU 61 of the port information transmitting device 6 of the network system according to the third embodiment of the present invention. The CPU 61 of the port information transmitting device 6 receives the communication packet from the communication device 2 (Step S1201). The CPU 61 analyzes the received communication packet (Step S1202) and then determines whether the data part thereof contains the predetermined constant numeric value (Step S1203).

When determined that the predetermined constant numeric value is contained (Step S1203: YES), the CPU 61 determines that the packet is the pseudo-packet and stores the address containing the global address of the communication device 2 translated by the address translation device 5 and the port number P1, as the destination address, in the port information table 621 (Step S1204).

When determined that the predetermined constant numeric value is not contained (Step S1203: NO), the CPU 61 determines whether the destination address (global address) and the corresponding port number of the received communication packet are identical to the source address (global address) and the port number stored in the port information table 621 (Step S1205).

When determined that they are not identical (Step S1205: NO), the CPU 61 executes the normal communication process (Step S1206). Therefore, the data can not be transmitted between the communication devices unless the NAT problem is solved.

When determined that they are identical (Step S1205: YES), the CPU 61 determines that the NAT problem is solved in the received communication packet, the new communication packet is generated using the received communication packet as the data part without change and by adding the source address stored in the port information table 621 as the destination address (Step S1207). For sending to the communication device 2, the newly generated communication packet is passed to the address translation device 5, which in turn translates the global address (destination address) 200.0.0.1 of the communication packet into the private address 192.168.1.2 and send the packet to the communication device 2.

Here, as in the first and second embodiments, the port number stored in the RAM 52 of the address translation device 5 is erased after a certain period of time. Therefore, in the third embodiment as well, to perform the P2P communication continuously between the communication devices, the pseudo-packet is sent to the port information transmitting device 6 at a certain time interval shorter than the period of time for the port number being erased. Consequently, the port number usable for the P2P communication between the communication devices can be acquired continuously, allowing the P2P communication being performed uninterruptedly.

Moreover, there is a physical range for the port number being able to be assigned by the address translation device 5. Therefore, the port number may be duplicated when the P2P communication is performed above a certain number of times. Thus, it is preferable that the communication devices 2, 2, . . . or the communication devices 4, 4, . . . send certain memory erase information contained in the pseudo-packet for every fixed number of communications. In this case, the port information transmitting device 6 determines whether the pseudo-packet contains the memory erase information, and when determined that the memory erase information is contained, the port information containing the global address corresponding to the source of the pseudo-packet is erased from the port information table 621. As a result, the duplication of the port number can be prevented from occurring.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A network system, comprising:
a plurality of communication devices which can communicate with each other;
an address translation device having a table to translate a global address and a private address into each other, the address translation device assigns port information to the private address to be used and relays data transmission between the communication devices; and
a port information transmitting device connected between the address translation device and an external network to transmit the port information assigned by the address translation device, wherein
one of the plurality of said communication devices comprises:
means for sending a pseudo-packet containing an address of another communication device and predetermined information, before sending information to another communication device, to the port information transmitting device via the address translation device,
the address translation device comprises:
means for assigning new port information to a pseudo-packet address of one of the communication devices, and
means for sending the address of one of the communication devices and the assigned port information to the port information transmitting device, wherein
the port information transmitting device comprises:
determining means for determining whether a received communication packet contains the predetermined information; and
means for sending the port information corresponding to the received address of one of the communication devices in case that said determining means determines that the predetermined information is contained,
one of the communication devices further comprises:
means for sending the received address of one of the communication devices and the assigned port information to another communication device, and another communication device further comprises:
means for transmitting information with one of the communication devices using the received address of one of the communication devices and the assigned port information.

2. The network system according to claim 1, wherein the pseudo-packet is sent at a certain time interval.

3. A network system, comprising:
a plurality of communication devices which can communicate with each other;
an address translation device having a table to translate a global address and a private address into each other, the address translation device assigns port information to the private address to be used and relays data transmission between the communication devices; and
a port information transmitting device connected between the address translation device and an external network to transmit the port information assigned by the address translation device, wherein
one of the plurality of said communication devices comprises:
means for sending a pseudo-packet containing an arbitrary address and predetermined information to the address translation device before sending information to another communication device,
the address translation device comprises:
means for assigning new port information to the private address of one of the communication devices when the pseudo-packet is received; and
means for sending the global address translated from the private address of one of the communication devices and the assigned port information to the port information transmitting device,
the port information transmitting device comprises:
determining means for determining whether a received communication packet contains the predetermined information;
means for storing the port information corresponding to the received global address of one of the communication devices, the arbitrary address, and the private address of one of the communication devices, in case that said determining means determines that the predetermined information is contained; and
means for sending the port information corresponding to the received global address of one of the communication devices to one of the communication devices,
one of the communication devices further comprises:
means for sending the received global address of one of the communication devices and the assigned port information to another communication device, and
the port information transmitting device further comprises:
determining means for determining whether a destination address and the port information contained in the communication packet received from another communication device are identical to the global address and the port information of one of the communication devices stored therein; and
means for sending the communication packet to one of the communication devices in case that said determining means determines that they are identical.

4. The network system according to claim 3, wherein the port information transmitting device comprises:
means for generating a new communication packet using the received communication packet as the data part and by adding the global address and the port information of one of the communication devices stored therein as the destination address, when it is determined that the destination address and the port information of the received communication packet from another communication device are identical to the global address and the port information of one of the communication devices stored therein; and means for sending the newly generated communication packet to one of the communication devices.

5. The network system according to claim 3, wherein the port information transmitting device comprises:

determining means for determining whether the pseudo-packet contains memory erase information to erase the information stored in the memory; and means for erasing the information stored in the memory in case that said determining means determines that the memory erase information is contained.

6. The network system according to claim 4, wherein the port information transmitting device comprises:

determining means for determining whether the pseudo-packet contains memory erase information to erase the information stored in the memory; and means for erasing the information stored in the memory in case that said determining means determines that the memory erase information is contained.

7. The network system according to claim 3, wherein the pseudo-packet is sent at a certain time interval.

8. A network system, comprising:

a plurality of communication devices which can communicate with each other;

an address translation device having a table to translate a global address and a private address into each other, the address translation device assigns port information to the private address to be used and relays data transmission between the communication devices; and a port information transmitting device connected between the address translation device and an external network to transmit the port information assigned by the address translation device, wherein one of the plurality of said communication devices comprises a processor capable of performing the operation of:

sending a pseudo-packet containing an address of another communication device and predetermined information, before sending information to another communication device, to the port information transmitting device via the address translation device, the address translation device comprises a processor capable of performing the operations of:

assigning new port information to a pseudo-packet address of one of the communication devices, and sending the address of one of the communication devices and the assigned port information to the port information transmitting device, the port information transmitting device comprises a processor capable of performing the operations of:

determining whether a received communication packet contains the predetermined information, and sending the port information corresponding to the received address of one of the communication devices in case that it is determined that the predetermined information is contained, one of the communication devices comprises a processor further capable of performing the operations of:

sending the received address of one of the communication devices and the assigned port information to another communication device, and another communication device comprises a processor further capable of performing the operation of:

transmitting information with one of the communication devices using the received address of one of the communication devices and the assigned port information.

9. The network system according to claim 8, wherein the pseudo-packet is sent at a certain time interval.

10. A network system, comprising:

a plurality of communication devices which can communicate with each other;

an address translation device having a table to translate a global address and a private address into each other, the address translation device assigns port information to the private address to be used and relays data transmission between the communication devices; and a port information transmitting device connected between the address translation device and an external network to transmit the port information assigned by the address translation device, wherein one of the plurality of said communication devices comprises a processor capable of performing the operation of:

sending a pseudo-packet containing an arbitrary address and predetermined information to the address translation device before sending information to another communication device, the address translation device comprises a processor capable of performing the operations of:

assigning new port information to the private address of one of the communication devices when the pseudo-packet is received; and sending the global address translated from the private address of one of the communication devices and the assigned port information to the port information transmitting device, the port information transmitting device comprises a processor capable of performing the operations of:

determining whether a received communication packet contains the predetermined information, storing the port information corresponding to the received global address of one of the communication devices, an arbitrary address, and the private address of one of the communication devices, in case that determined that the predetermined information is contained; and sending the port information corresponding to the received global address of one of the communication devices to one of the communication devices, one of the communication devices comprises a processor further capable of performing the operation of:

sending the received global address of one of the communication devices and the assigned port information to another communication device, the port information transmitting device comprises a processor further capable of performing the operations of:

determining whether a destination address and the port information contained in the communication packet received from another communication device are identical to the global address and the port information of one of the communication devices stored therein, and sending the communication packet to one of the communication devices in case that it is determined that they are identical.

11. The network system according to claim 10, wherein the port information transmitting device comprises a processor further capable of performing the operations of:

generating a new communication packet using the received communication packet as the data part and by adding the global address and the port information of one of the communication devices stored therein as the destination address, in case that it is determined that the destination address and the port information of the received communication packet from another communication device are identical to the global address and the port information of one of the communication devices stored therein, and sending the newly generated communication packet to one of the communication devices.

12. The network system according to claim 10, wherein the port information transmitting device comprises a processor further capable of performing the operations of:

determining whether the pseudo-packet contains memory erase information to erase the information stored in the memory, and erasing the information stored in the memory in case it is determined that the memory erase information is contained.

13. The network system according to claim 11, wherein the port information transmitting device comprises a processor further capable of performing the operations of:

determining whether the pseudo-packet contains memory erase information to erase the information stored in the memory, and erasing the information stored in the memory in case it is determined that the memory erase information is contained.

14. The network system according to claim 10, wherein the pseudo-packet is sent at a certain time interval.

15. A communication method, using a plurality of communication devices which can communicate with each other, an address translation device having a table to translate a global address and a private address into each other, the address translation device assigns port information to the private address to be used and relays data transmission between the communication devices, and a port information transmitting device connected between the address translation device and an external network to transmit the port information assigned by the address translation device, wherein the communication method comprises the steps of:

sending a pseudo-packet containing an address of one of the plurality of said communication devices and predetermined information, before sending information to one of the communication devices, to the port information transmitting device via the address translation device;

assigning new port information to a pseudo-packet address of another communication device, and sending the address of another communication device and the assigned port information to the port information transmitting device;

determining whether a received communication packet contains the predetermined information, and sending the port information corresponding to the received address of another communication device when it is determined that the predetermined information is contained;

sending the received address of another communication device and the assigned port information to one of the communication devices; and transmitting information with another communication device using the received address of another communication device and the assigned port information.

16. The communication method according to claim 15, wherein the pseudo-packet is sent at a certain time interval.

17. A communication method, among a plurality of communication devices which can communicate with each other, using an address translation device having a table to translate a global address and a private address into each other, the address translation device assigns port information to the private address to be used and relays data transmission between the communication devices, and a port information transmitting device connected between the address translation device and an external network to transmit the port information assigned by the address translation device, wherein the communication method comprises the steps of:

sending a pseudo-packet containing an arbitrary address and predetermined information to the address translation device before sending information to one of the plurality of said communication devices;

assigning new port information to the private address of another communication device when the pseudo-packet is received, and sending the global address translated from the private address of another communication device and the assigned port information to the port information transmitting device;

by using the port information transmitting device, determining whether a received communication packet contains the predetermined information, storing the port information conesponding to the received global address of another communication device, an arbitrary address, and the private address of another communication device, in case that it is determined that the predetermined information is contained, and sending the port information corresponding to the received global address of another communication device to another communication device;

sending the received global address of another communication device and the assigned port information to one of the communication devices;

determining whether a destination address and the port information contained in the communication packet received from one of the communication devices are identical to the global address and the port information of another communication device stored therein, and sending the communication packet to another communication device when determined that they are identical.

18. The communication method according to claim 17, further comprising the steps of:

generating a new communication packet using the received communication packet as the data part and by adding the global address and the port information of another communication device stored therein as the destination address, in case that it is determined that the destination address and the port information of the received communication packet from one of the communication devices are identical to the global address and the port information of another communication device stored therein; and sending the newly generated communication packet to another communication device.

19. The communication method according to claim 17, further comprising the steps of:

determining whether the pseudo-packet contains memory erase information to erase the information stored in the memory; and erasing the information stored in the memory in case it is determined that the memory erase information is contained.

20. The communication method according to claim 17, wherein the pseudo-packet is sent at a certain time interval.

* * * * *